No. 719,333. PATENTED JAN. 27, 1903.
J. B. F. HERRESHOFF.
APPARATUS FOR THE MANUFACTURE OF SULFURIC ANHYDRID.
APPLICATION FILED JAN. 10, 1902.
NO MODEL.
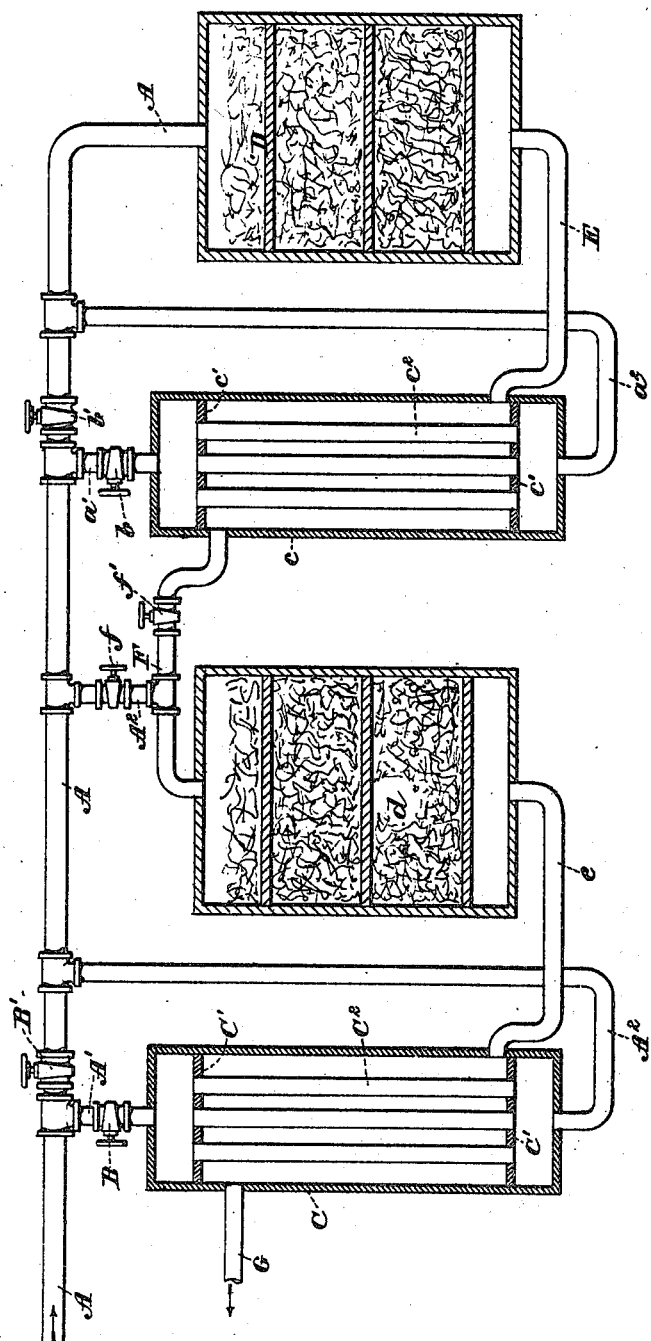
WITNESSES:
Gustave Dieterich.
John Lotka
INVENTOR
J. B. F. Herreshoff.
BY Briesen & Knauth
ATTORNEYS

UNITED STATES PATENT OFFICE.

JOHN B. FRANCIS HERRESHOFF, OF BROOKLYN, NEW YORK.

APPARATUS FOR THE MANUFACTURE OF SULFURIC ANHYDRID.

SPECIFICATION forming part of Letters Patent No. 719,333, dated January 27, 1903.

Application filed January 10, 1902. Serial No. 89,096. (No model.)

*To all whom it may concern:*

Be it known that I, JOHN BROWN FRANCIS HERRESHOFF, a citizen of the United States, and a resident of the city of New York, borough of Brooklyn, in the county of Kings and State of New York, have invented a new and Improved Apparatus for the Manufacture of Sulfuric Anhydrid, of which the following is a full, clear, and exact specification.

My invention relates to apparatus for the manufacture of sulfuric anhydrid according to the so-called "contact" process, and has for its object to provide an apparatus of this class which will permit of a ready regulation of the temperature, so as to obtain a high efficiency, and to keep the heat within relatively low figures, so that the durability of the plant will be materially increased.

To this end I employ an apparatus comprising a plurality of contact-chambers and connections by means of which incoming gas is caused to pass through said chambers in succession, and I provide in addition in the connection from one contact-chamber to the next a heat-exchange apparatus by means of which the heat of the outgoing mixture is absorbed by the incoming mixture, so that I obtain at the same time a heating of the unconverted mixture and a cooling of the partially-converted mixture, thus bringing both to the temperature which is best adapted for the starting and the continuation, respectively, of the contact reaction.

The invention will be fully described hereinafter and the features of novelty pointed out in the appended claims.

Reference is to be had to the accompanying drawing, which is an elevation of a portion of a sulfuric-acid plant with parts in section.

A is the main pipe, through which the cool or previously-heated mixture of sulfurous-acid gas and air is supplied to this portion of the plant.

A' is a connection controlled by a valve B and leading from the supply-pipe A to a heat-exchange apparatus C. This apparatus may be of any suitable construction, and, as shown, it comprises a casing with partitions C', dividing it into a central chamber and two end chambers. The latter are connected by tubes $C^2$. From the outlet end of the casing C a pipe $A^2$ leads back to the supply-pipe A, a valve B' being interposed between two points at which the connection A' and the pipe $A^2$ are joined to the pipe A. At a farther point of the supply-pipe A is located a heat-exchange apparatus c, having partitions c' and connecting-tubes $c^2$ and adapted to communicate with the supply-pipe A by a connection a' and an outlet-pipe $a^2$, these being arranged correspondingly to the parts A' $A^2$. Valves b b' are here provided in the same relation as the valves B B'. The end of the pipe A is connected with a contact-chamber D, which may be of any suitable construction and which may be much shorter than the contact-chambers usually employed. This contact-chamber may also differ from the usual ones by employing increasingly-richer contact material from the inlet toward the outlet, so that the comparatively rich incoming gas mixture will first meet layers of asbestos or other carrier containing only a relatively small proportion of contact substances, while the gas impoverished by a partial conversion into sulfurous anhydrid will come in contact with layers in which the contact material is richer—that is, more densely distributed. In this manner I may secure a more gradual reaction and keep the temperature of the gas at the outlet relatively low. I desire it to be clearly understood, however, that the usual arrangement of uniformly-distributed contact material may be employed, as the main advantages of my invention result from the partial completion of the reaction in one chamber and its continuation in another contact-chamber after intermediate cooling.

E is a pipe which connects the outlet of the contact-chamber D with the central chamber of the heat-exchange apparatus c. From this central chamber a pipe F leads to another contact-chamber d, the outlet-pipe e of which is connected with the central chamber of the heat-exchange apparatus C. From this chamber leads an outlet-pipe G, connected with any suitable apparatus at which the sulfuric anhydrid is stored or utilized or with another contact-chamber, it being understood that the plant may comprise three, four, or more sets of contact-chambers and heat-exchange apparatuses connected with each other in the same manner as the apparatuses c, d, and C in the drawing.

In the normal operation of the apparatus the valves B' b' may be closed at first, while the valves B b are open. This will cause the incoming gas mixture to first enter the heat-exchange apparatus C, then pass through the central portion of the supply-pipe A, then through the heat-exchange apparatus c, and finally to the first contact-chamber D. The partially-converted mixture flows through the pipe E, the central chamber of the heat-exchange apparatus c, and the pipe F to the second contact-chamber D, where the reaction is continued, so as to complete the conversion into sulfuric anhydrid or at least bring the conversion nearer completion. The gas then passes through the pipe e and the central chamber of the heat-exchange apparatus C to the outlet-pipe G. It will be seen that the incoming gas comes into heat-exchange relation with the outgoing partially or entirely converted product twice in succession and that it first is heated by the product which is nearest completion and then by the product which is not so completely converted. Thus at the time the incoming gas reaches the contact-chamber D said gas is heated to the proper temperature for the beginning of the reaction. In some cases the heating effect of the two apparatuses C and c might be too energetic, and in such cases a reduction of this effect may readily be obtained by causing a portion of the incoming mixture to pass only through one of the heat-exchange apparatuses instead of through both of them or even to pass directly to the contact-chamber D. This will be readily obtained by a proper manipulation of the valves B B' b b'. Thus if in addition to the valves B b the valve B' also is opened a portion of the incoming mixture will flow directly to the heat-exchange apparatus c without passing through the heat-exchange apparatus C. The proportion can be varied by opening the valve B' more or less or by a corresponding manipulation of the valves B b. If in addition to this the valve b' is also opened, a certain portion of the incoming mixture will pass directly to the contact-chamber D, thus further reducing the temperature of the mixture at the inlet of said chamber. Thermometers located at suitable points of the pipe A will enable the attendant to properly adjust the several valves.

The temperature of the partially-converted mixture passing through the pipe E is of course higher than that at the inlet, and a cooling is required to bring the temperature down to that best adapted for the beginning, or rather continuation, of the contact reaction in the second chamber d. This is effected in the apparatus shown by the absorption of heat from the partially-converted mixture through the medium of the incoming gas which passes through the heat-exchange apparatus c. The cooled partially-converted mixture is then again subjected to the contact process in the second chamber d, and the product which leaves this chamber is fully converted, or at least more nearly so than that leaving the first contact-chamber D. If a further repetition of the process is required, the outgoing gas mixture is again cooled and led into another contact-chamber.

Inasmuch as when using my apparatus the temperatures remain considerably below those which occur in the usual contact-chambers, the apparatus has a much longer life and its efficiency is considerably increased. The avoidance of very high temperatures also insures a more perfect result, in that dissociation of the sulfuric anhydrid is less likely to take place. The exchange of heat or absorption of heat is also more perfect, for the reason that the difference of temperatures between the absorbing medium and the medium from which heat is abstracted is much smaller than hitherto in processes of this character. Another advantage of the use of a plurality of contact-chambers is that repairs to individual parts of the apparatus may be readily effected without necessitating a complete stoppage of the process. This is particularly the case when three or more contact-chambers are employed. To enable one of the contact-chambers to be cut out, I provide suitable connections—such as, for instance, a pipe $A^2$, leading from the supply-pipe A to the conveying-pipe F—and I provide valves f f', one in the connection $A^2$ and the other in the pipe F between the connection $A^2$ and the heat-exchange apparatus c. By closing the valves b' f' and opening the valve f the gas mixture may be caused to pass from the supply-pipe a directly to the second contact-chamber d, so that repairs may be made to the first contact-chamber D or to the heat-exchange apparatus c without disturbing the operation.

I claim as my invention and desire to secure by Letters Patent—

1. In an apparatus for manufacturing sulfuric anhydrid by catalytic action as set forth, the combination of a plurality of separate chambers containing catalytic material, a connection from the outlet of one chamber to the inlet of the next, said connection having only inlet and outlet terminal openings, to prevent admixture of other fluids, and a cooler separate from the said chambers, applied to the said connection.

2. In an apparatus for the manufacture of sulfuric anhydrid by catalytic action as set forth, the combination of a plurality of separate chambers containing catalytic material, a connection from the outlet of one chamber to the inlet of the next, and a double-path heat-exchange apparatus, separate from said chambers, and having one of its paths interposed in said connection, and a connection from the other path of the said heat-exchange apparatus to the inlet of one of said chambers.

3. In an apparatus for the manufacture of sulfuric anhydrid by catalytic action as set forth, the combination of a plurality of contact-chambers, a supply-pipe for conveying the incoming gas to the apparatus, a pipe connecting the outlet of one contact-chamber with the inlet of the next, and a heat-exchange apparatus having two separate paths or channels, one of which is interposed in said connection while the other is connected respectively with the inlet of the first contact-chamber and with the supply-pipe.

4. In an apparatus for the manufacture of sulfuric anhydrid by catalytic action as set forth, the combination of a plurality of contact-chambers, a connection leading from the outlet of one chamber to the inlet of the next, a heat-exchange apparatus located in said connection, a supply-pipe connected with the inlet of the first contact-chamber and also connected with said heat-exchange apparatus, and mechanism for controlling the flow of the gas from said supply-pipe directly to the contact-chamber and to the heat-exchange apparatus.

5. In an apparatus for the manufacture of sulfuric anhydrid by catalytic action as set forth, the combination of a plurality of contact-chambers, a connection leading from the outlet of one chamber to the inlet of the next, a heat-exchange apparatus having two separate paths one of which is interposed in said connection, a supply-pipe having a connection to the inlet of the first contact-chamber and two connections to the other path of the heat-exchange apparatus, and valves controlling respectively the connection from the supply-pipe to the heat-exchange apparatus and the direct connection from said supply-pipe to the contact-chamber.

6. In an apparatus for the manufacture of sulfuric anhydrid by catalytic action as set forth, the combination of a plurality of contact-chambers and a plurality of heat-exchanging apparatuses, each of latter having two separate paths or channels, a connection from the outlet of one contact-chamber to one path of the adjacent heat-exchange apparatus, an outlet connection from the same path of said heat-exchange apparatus to the inlet of the next contact-chamber, a supply-pipe having a valved connection with the other path of each heat-exchange apparatus, an additional connection with such path of each heat-exchange apparatus, and a further connection with the inlet of the first contact-chamber, and valves interposed in the supply-pipe between its two connections with the same heat-exchange apparatus.

7. In an apparatus for the manufacture of sulfuric anhydrid by catalytic action as set forth, the combination of a plurality of contact-chambers and a plurality of heat-exchange apparatuses, each of the latter having two separate paths or channels, a supply-pipe connected with one path of one of the heat-exchange apparatuses, a connection from the same path of said apparatus to the like path of the next heat-exchange apparatus, a connection from the inlet of the first contact-chamber to the said path of the adjacent heat-exchange apparatus, a connection from the outlet of said contact-chamber to the other path of the adjacent heat-exchange apparatus, another connection from said other path to the inlet of the next contact-chamber, and a connection from the outlet of said next contact-chamber to the second path of the heat-exchange apparatus, the first-mentioned path of which is connected with the supply-pipe.

In testimony whereof I have signed my name to this specification in the presence of two subscribing witnesses.

JOHN B. FRANCIS HERRESHOFF.

Witnesses:
JOHN LOTKA,
EUGENE EBLE.